(12) United States Patent
Morita et al.

(10) Patent No.: US 8,259,453 B2
(45) Date of Patent: Sep. 4, 2012

(54) CARD DEVICE (75) Inventors: Kaori Morita, Aichi (JP); Tomoyasu Yamada, Aichi (JP); Tamotsu Kiyakawauchi, Aichi (JP); Akitomi Katsumura, Aichi (JP); Koji Shiozawa, Aichi (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 12/964,821

(22) Filed: Dec. 10, 2010

(65) Prior Publication Data
US 2011/0157838 A1 Jun. 30, 2011

(30) Foreign Application Priority Data
Dec. 28, 2009 (JP) .................................. 2009-298720

(51) Int. Cl.
*H05K 7/02* (2006.01)
(52) U.S. Cl. ......... 361/737; 361/752; 235/492; 439/945
(58) Field of Classification Search .................. 361/737, 361/752; 439/945, 946; 257/679; 235/441, 235/488, 492
See application file for complete search history.

(56) References Cited

U.S. PATENT DOCUMENTS

| | | | | |
|---|---|---|---|---|
| 6,573,567 B1 * | 6/2003 | Nishizawa et al. | ............ | 257/358 |
| 7,224,052 B2 * | 5/2007 | Nishizawa et al. | ............ | 257/679 |
| 7,476,105 B2 * | 1/2009 | Ni et al. | ............ | 439/66 |
| 7,564,961 B2 * | 7/2009 | Anders et al. | ............ | 379/220.01 |
| 7,804,163 B2 * | 9/2010 | Hiew et al. | ............ | 257/679 |
| 7,834,276 B2 * | 11/2010 | Chou et al. | ............ | 174/262 |
| 8,102,568 B2 * | 1/2012 | Silverbrook | ............ | 358/1.9 |

FOREIGN PATENT DOCUMENTS

JP 2006-092094 4/2006

* cited by examiner

*Primary Examiner* — Dameon Levi
(74) *Attorney, Agent, or Firm* — SNR Denton US LLP (57) ABSTRACT

Disclosed herein is a card device including a semiconductor package section having memory functions and a substrate section joined to the semiconductor package section by superposition and mounted by a variety of electronic components. The semiconductor package section includes a card-side connector section having card-side terminals for inputting and outputting information signals, and package-side terminals at a location at which the semiconductor package section is joined to the substrate section by superposition. The substrate section includes substrate-side terminals at a location at which the substrate section is connected to the semiconductor package section by superposition. The substrate section is electrically joined to the semiconductor package section by making use of the package-side terminals and the substrate-side terminals. The superposition junction between the semiconductor package section and the substrate section is provided with such an offset that the card-side connector protrudes out off the card device.

11 Claims, 7 Drawing Sheets

CARD DEVICE

BACKGROUND OF THE INVENTION

1. Field of the Invention

The present invention relates to a card device having memory functions.

2. Description of the Related Art

Japanese Patent Laid-open No. 2006-92094 (Patent Document 1) discloses a card device having a memory embedded therein.

SUMMARY OF THE INVENTION

By the way, if an attempt is made to add a new function other than memory functions to a card device serving as a memory card, the size of an area occupied by components required for execution of the already existing memory functions has to be inevitably increased.

Thus, it is difficult to allocate a sufficient area to a component to be added to serve as a component required for execution of the newly added function.

In addition, it is also necessary to provide the memory card with a variety of hardware elements and terminals used for propagation of information at dimensions determined on the basis of upper and lower surfaces of a cabinet for accommodating the memory card.

In the case of the conventional memory card in the past, however, such terminals are provided on a substrate embedded in the cabinet. Thus, a space for implementation of the hardware elements can be provided only between the upper surface of the substrate and the lower surface of the top portion of the cabinet.

As a result, it is necessary to impose strict restrictions on the heights of implemented elements, and such restrictions undesirably become design restrictions.

That is to say, a wasted space with a thickness equal to the thickness of the substrate exists in the thickness direction.

In addition, in accordance with the method of the related art, it is necessary to adjust the heights of the implemented elements so that, the thicker the substrate, the smaller the heights of the implemented elements. Thus, in order to assure a space in the height direction of the implemented elements, as thin a substrate as possible is designed.

If the substrate is too thin, however, the substrate unavoidably becomes easy to roll back and such a substrate is not proper for a terminal section which requires strict coplanarity which is a uniformity of a lowest surface of components exposed to an installation surface.

In addition, in accordance with a method disclosed in Patent Document 1, an adapter section is created on a substrate. Thus, the method has a demerit that a height space for implementing a variety of electronic components is restricted.

Addressing the problems described above, inventors of the present invention have proposed a card device capable of assuring a sufficient height space for implementing a variety of electronic components.

A card device according to an embodiment of the present invention includes a semiconductor package section having memory functions, and a substrate section joined to the semiconductor package section by superposition and mounted by a variety of electronic components. The semiconductor package section includes a card-side connector section having card-side terminals for inputting and outputting information signals created on a surface on which a junction between the substrate section and the semiconductor package section is formed and package-side terminals at a location at which the semiconductor package section is joined to the substrate section by superposition. The substrate section includes substrate-side terminals at a location at which the substrate section is connected to the semiconductor package section by superposition. The substrate section is electrically joined to the semiconductor package section by making use of the package-side terminals and the substrate-side terminals. The superposition junction between the semiconductor package section and the substrate section is provided with such an offset that the card-side connector protrudes out off the card device.

In accordance with the present invention, it is possible to provide a card device capable of assuring a sufficient height space for implementing a variety of electronic components.

BRIEF DESCRIPTION OF THE DRAWINGS

These and other innovations as well as features of the present invention will become clear from the following description of a preferred embodiment given with reference to accompanying diagrams, in which.

DETAILED DESCRIPTION OF THE PREFERRED EMBODIMENT

A preferred embodiment of the present invention is explained by dividing the explanation into chapters. It is to be noted that, in the following explanation, the preferred embodiment of the present invention is also referred to simply as an embodiment. The chapters are arranged in an order shown as follows.

1: General Overview of the Use of the Memory Card 1
2: Mechanical Structure of the Memory Card 1
3: Electrical Configuration of the Memory Card 1
1: General Overview of the Use of the Memory Card 1
[Typical External Appearance of the Memory Card 1]

Figure 1:
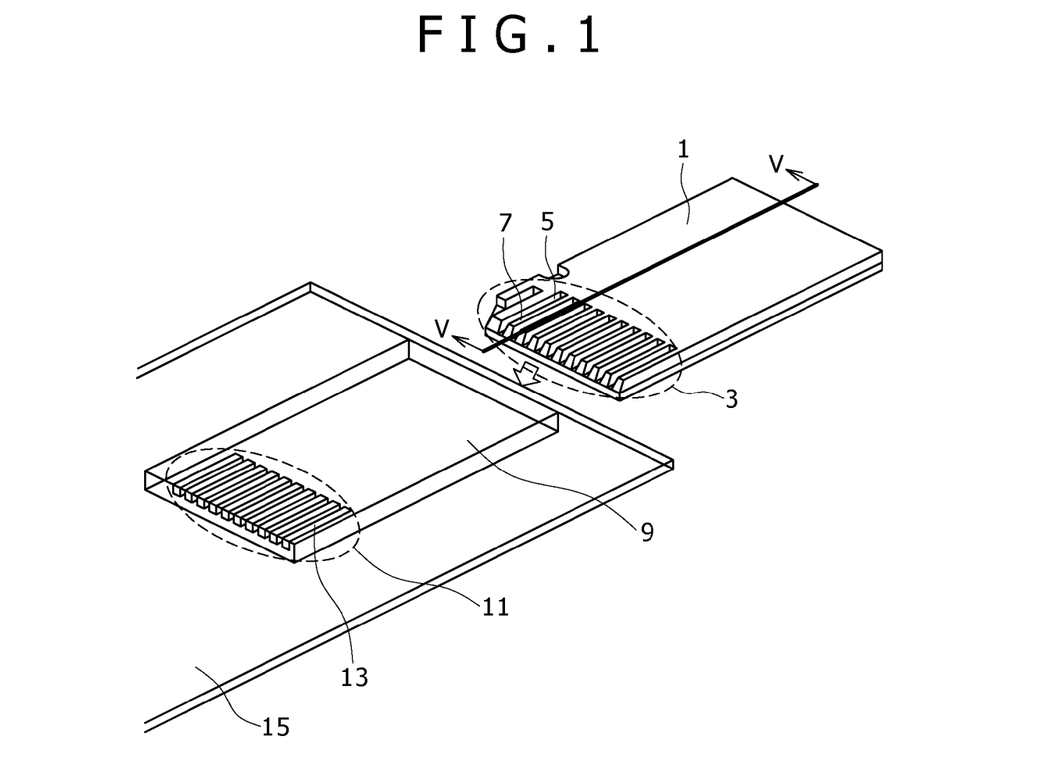
FIG. 1 is a perspective view showing an external appearance of a memory card according to an embodiment of the present invention.

FIG. 1 is a perspective view showing an external appearance of a memory card 1 according to an embodiment of the present invention.

As shown in FIG. 1, the memory card 1 serving as a typical card device has a planar shape. This memory card 1 is typically inserted into a slot 9 provided in an electronic apparatus side substrate 15 employed in an electronic apparatus for example.

When the memory card 1 is inserted into the slot 9 provided in the electronic apparatus side substrate 15, the memory card 1 is connected to an electronic circuit and the like provided on the electronic apparatus side substrate 15, so that the memory card 1 can carry out a variety of functions.

In particular, the memory card 1 is used for storing an information signal which is received from the electronic circuit. As another function, the memory card 1 outputs an information signal stored therein to the electronic circuit.

The memory card 1 has a card side connector section 3 provided on one of the two planar surface sides in the longitudinal direction of the rectangular plane.

On the card side connector section 3, a plurality of grooves 5 each having a slit shape are created to form a comb-like shape.

At the bottom of each of the grooves 5, a card side terminal 7 is created.

As will be explained later in detail by referring to a block diagram which serves as FIG. 7, each of the card side terminals 7 is connected electrically to a controller section 37 embedded in the memory card 1.

That is to say, each of the card side terminals 7 plays the role of an interface for exchanging information between the memory card 1 and the electronic circuit provided on the electronic apparatus side substrate 15 employed in the electronic apparatus to which the memory card 1 is connected.

The slot 9 is also formed into a planar shape with rectangular planes each having a size slightly larger than the size of the memory card 1 so that the memory card 1 can be inserted into the slot 9.

The slot 9 is mechanically fixed on the electronic apparatus side substrate 15.

The memory card 1 is inserted into the slot 9 in a direction so that the memory card 1 is attached to an inner side of the slot 9. That is to say, the inner side of the slot 9 is the side facing the electronic apparatus side substrate 15. On the inner side of the slot 9, a slot-side connector section 11 is created.

On the slot-side connector section 11, protruding slot side terminals 13 are created in such a way that the protruding slot side terminals 13 are properly engaged with the grooves 5 created on the memory card 1.

The slot side terminals 13 are electrically connected to the electronic circuit provided on the electronic apparatus side substrate 15.

That is to say, each of the slot side terminals 13 plays the role of an interface for exchanging information between the memory card 1 and the electronic circuit in the electronic apparatus to which the memory card 1 is connected.

When the memory card 1 is inserted into the slot 9, the slot side terminals 13 are brought into contact with the card side terminals 7, being electrically connected to the card side terminals 7.

With the memory card 1 inserted into the slot 9, the electronic circuit employed in the electronic apparatus is electrically connected to the controller section 37 embedded in the memory card 1 so that an information signal can be exchanged between the electronic circuit and the controller section 37.

In this embodiment, each of the number of aforementioned grooves 5, the number of aforementioned card side terminals 7 and the number of aforementioned slot side terminals 13 is set at 14. However, these numbers can be increased or decreased if necessary.

In addition, the grooves 5 are not always required. That is to say, the memory card 1 can also be created without the grooves 5.

The memory card 1 does not have to be designed as a card having a planar shape. If necessary, the memory card 1 can be designed as a card having a cubic shape or another shape.

Furthermore, the memory card 1 can also be provided with a variety of functions other than the function to store information.

Typical examples of the functions provided for the memory card 1 to serve as the functions other than the function to store information are a radio-communication function, a function to authenticate the owner of the memory card 1 serving as a non-contact IC card, a financial settlement function, a card key function, a location detection function, a communication/phone-call function, a password storing function and functions of a main CPU or a sub-CPU.

Furthermore, the memory card 1 can also have a function of a display section employed in an implemented display apparatus such as a liquid-crystal display apparatus or an OLCD apparatus.

That is to say, if necessary, the memory card 1 can be provided with a variety of functions other than the function to store information.

In the case of this embodiment in particular, the memory card 1 has the information storing function and the radio-communication function.

Typical examples of the electronic apparatus having the electronic apparatus side substrate 15 connected to the memory card 1 as described above are portable electronic apparatus such as a digital still camera 101, a cellular phone, a PDA, a portable game apparatus, a portable TV, a portable radio, a non-contact IC card and a portable notebook.

Moreover, other typical examples of the electronic apparatus having the electronic apparatus side substrate 15 also include non-portable electronic apparatus employed in equipment such as a TV, a video recorder, a phone, a refrigerator, a microwave oven, a machine tool, a communication device and an automobile.

In the case of this embodiment in particular, the memory card 1 is connected to a digital still camera 101 which serves as an electronic apparatus.

2: Mechanical Structure of the Memory Card 1
[Diagram Showing a Disassembled Memory Card 1]

Figure 2:
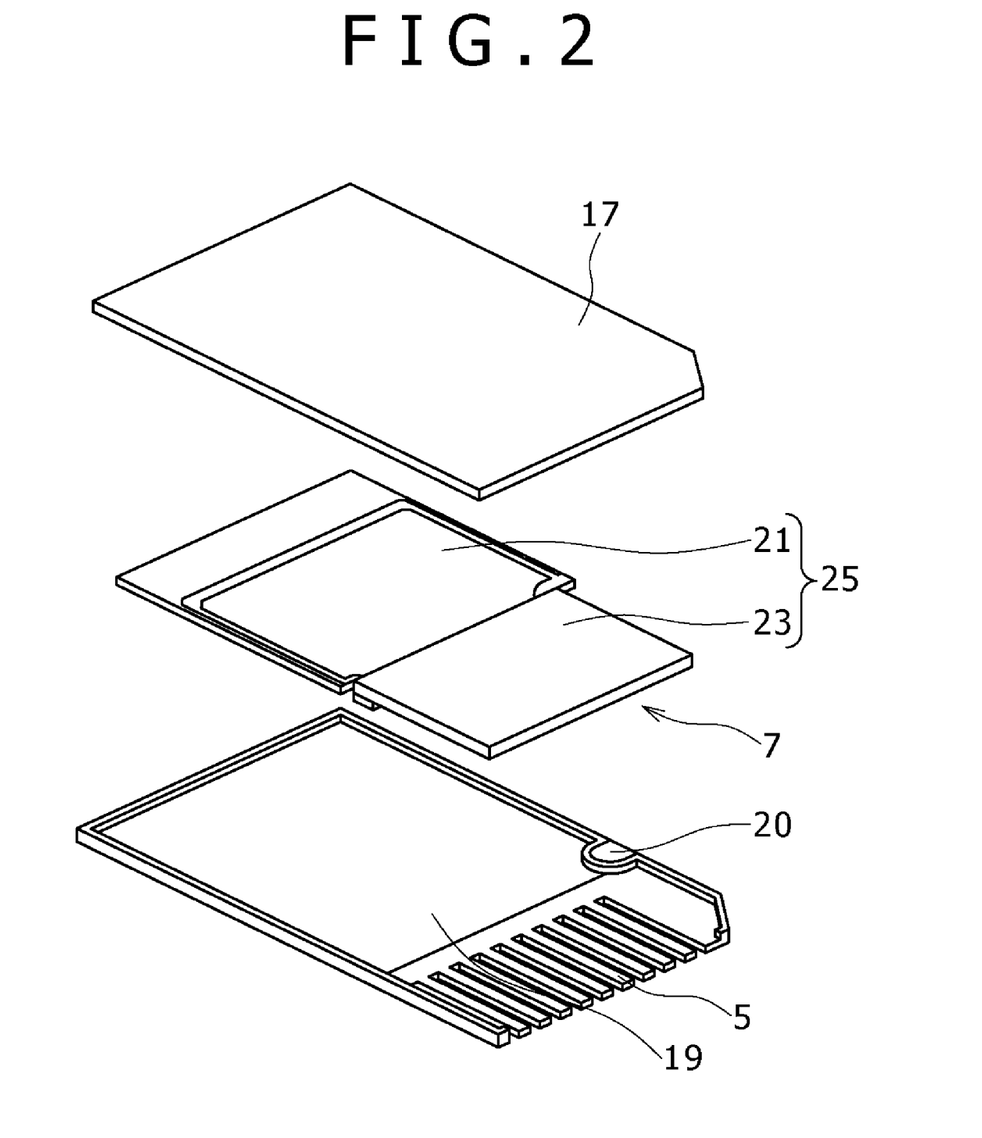
FIG. 2 is a perspective view showing the memory card in a disassembled state.

FIG. 2 is a perspective view showing the memory card 1 in a disassembled state.

As shown in FIG. 2, the memory card 1 accommodates an electronic circuit section 25 which is sandwiched between a first cabinet 17 and a second cabinet 19.

To put it in detail, the electronic circuit section 25 is accommodated in an internal space which is formed when the first cabinet 17 is joined to the second cabinet 19 by exposing the inner surface of the first cabinet 17 to the inner surface of the second cabinet 19.

As shown in FIG. 2, the electronic circuit section 25 includes a substrate section 21 and a semiconductor package section 23.

As will be described in detail in FIG. 4, the substrate section 21 is linked to the semiconductor package section 23 by adoption of a soldering technique and the like.

In addition, as will be described in detail in FIG. 7, a proximity radio communication electronic component 27 provided on the substrate section 21 is electrically connected to a controller section 37 provided on the semiconductor package section 23 so that an information signal can be exchanged between the proximity radio communication electronic component 27 and the controller section 37.

It is to be noted that the proximity radio communication electronic component 27 adopts a proximity radio communication technology for carrying out proximity radio communications at a center frequency of 4.48 GHz.

The semiconductor package section 23 is a semiconductor device including a semiconductor chip which is embedded in the semiconductor package section 23 by sealing the semiconductor chip by making use of a resin material.

As will be described in detail in FIG. 7, on the semiconductor chip embedded in the semiconductor package section 23, the controller section 37 and a memory section 39 are provided.

In addition, the card side terminals 7 are provided on the surface of the semiconductor package section 23.

Figure 3A:
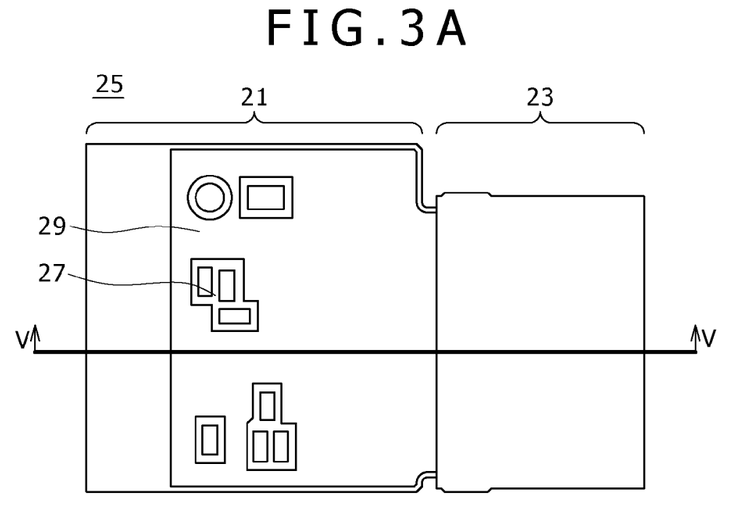
FIG. 3A is an explanatory diagram showing the top view of the memory card.
Figure 3B:
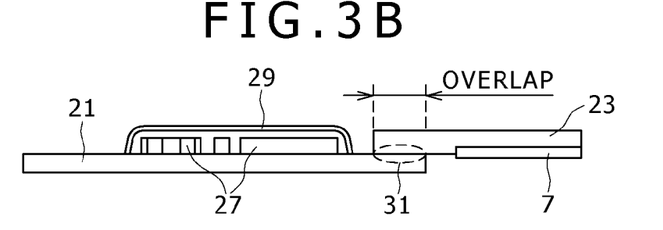
FIG. 3B is an explanatory diagram showing a cross section along a line V-V shown in the explanatory diagram which serves as FIG. 3A.

As shown in the cross-sectional diagram which serves as FIG. 3B, the card side terminals 7 are provided on the outer side of the surface of the semiconductor package section 23 so that the substrate section 21 can be overlapped on the inner side of the semiconductor package section 23.

As described above, the semiconductor package section 23 includes a semiconductor chip by sealing the semiconductor chip therein by making use of a resin material. In this case, the resin material can exhibit a thermally hardening property.

A possible typical example of the resin material exhibiting a thermally hardening property is the resin pertaining to the epoxy series.

Nevertheless, the resin material for sealing the semiconductor chip in the semiconductor package section 23 is by means limited to the resin pertaining to the epoxy series. For example, if necessary, the polyurethane resin, the silicon resin, the phenol resin, the unsaturated polyester resin or the polyimide resin can be used.

That is to say, any substance can be used as long as the substance is not bent excessively to exceed an allowable bending limit by an external force applied to the card side terminals 7.

In order to prevent the substance from being bent excessively to exceed an allowable bending limit by an external force applied to the card side terminals 7, it is possible to seal a metallic plate and the like inside the semiconductor package section 23 in order to enhance the strength or the semiconductor package section 23.

In addition, it is also possible to seal a carbon fiber and the like inside the semiconductor package section 23 in order to enhance the strength.

The substrate section 21 is made from typically a resin material.

A variety of electronic components are mounted on the substrate section 21.

In the case of this embodiment in particular, the electronic components are used in the proximity radio communications.

Most of the electronic components mounted on the substrate section 21 are mounted on a surface on a side connected to the semiconductor package section 23.

Particularly, it is desirable to mount electronic components having heights each exceeding a limit determined in advance on the side connected to the semiconductor package section 23.

Each of the first cabinet 17 and the second cabinet 19 is made from, for example, a resin material. However, materials for making the first cabinet 17 and the second cabinet 19 are by no means limited to the resin.

Each of the first cabinet 17 and the second cabinet 19 has a planar section having a fixed area. In addition, each of the first cabinet 17 and the second cabinet 19 also has side sections each extended to the inner side.

As described earlier, the electronic circuit section 25 is accommodated in an internal space which is formed when the first cabinet 17 is joined to the second cabinet 19 by exposing the inner surface of the first cabinet 17 to the inner surface of the second cabinet 19.

The first cabinet 17 is joined to the second cabinet 19 by adoption of typically the welding technique, another technique can be adopted. For example, the first cabinet 17 is joined to the second cabinet 19 by making use of bolts, nuts and screws.

In addition, in some cases, the first cabinet 17 and the second cabinet 19 are created as an integrated unit by adoption of the injection molding method.

As will be described in detail in FIG. 5, the first cabinet 17 is also joined to the electronic circuit section 25 by adoption of a welding technique.

In addition, on the surface on the external side of the planar section of the first cabinet 17, typically, a variety of displays may be printed.

At the position of one of the two portions in the longitudinal direction of the surface of the planar section, a plurality of aforementioned grooves 5 having a loophole structure are created.

Each of the grooves 5 is extended in the longitudinal direction of the surface of the planar section.

In addition, each of the grooves 5 is extended to the side surface of the second cabinet 19. On the side surface of the second cabinet 19, the grooves 5 also have a notch structure.

At the planar section of the second cabinet 19 in the transversal direction of the surface of the planar section and at the position close to the grooves 5, a dent 20 is created.

The dent 20 plays the role of a retainer for preventing the memory card 1 from falling out of the slot 9.

[Description of Electronic Circuit Section 25]

Figure 3C:
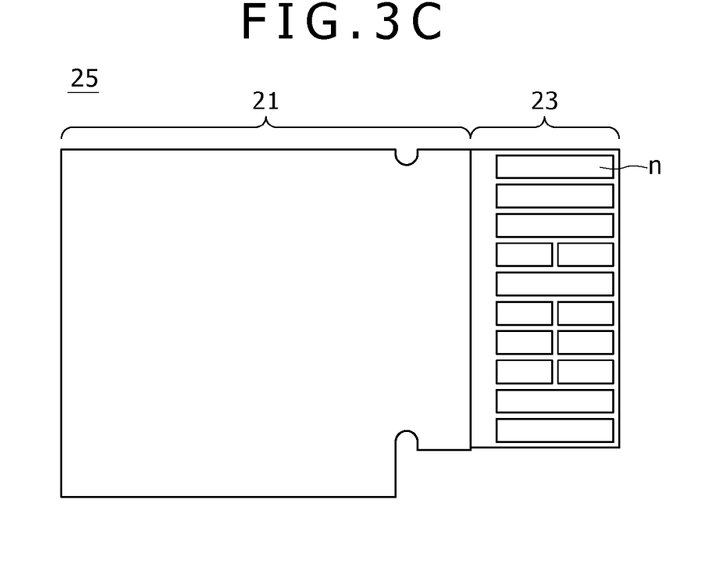
FIG. 3C is an explanatory diagram showing the bottom view of the memory card.

FIGS. 3A to 3C are a plurality of explanatory diagrams of an electronic circuit section 25 employed in the memory card 1 shown in FIG. 2. To be more specific, FIG. 3A is an explanatory diagram showing the top view of the memory card 1, FIG. 3B is an explanatory diagram showing a cross section along a line V-V shown in the explanatory diagram which serves as FIG. 3A, and FIG. 3C is an explanatory diagram showing the bottom view of the memory card 1.

As shown in the explanatory diagram which serves as FIG. 3A, the electronic circuit section 25 is configured to employ the substrate section 21 and the semiconductor package section 23.

As shown in the explanatory diagram which serves as FIG. 3B, a plurality of aforementioned card side terminals 7 are created on the planar surface of the semiconductor package section 23.

A plurality of a semiconductor chips are included in the inside of the semiconductor package section 23 so that the semiconductor package section 23 can be regarded as a semiconductor device having many functions.

To put it more concretely, as will be described in detail in FIG. 7, a controller section 37 and a memory section 39 are implemented in the semiconductor package section 23.

A plurality of electronic components are implemented in the substrate section 21. To put it more concretely, the substrate section 21 employs a proximity radio communication electronic component 27 used for carrying out proximity radio communications.

A portion of the proximity radio communication electronic component 27 is veiled by a cover 29.

As shown in the explanatory diagram which serves as FIG. 3B, the semiconductor package section 23 is overlapped on the substrate section 21 in a direction perpendicular to the surface of the planar shape.

However, the substrate section 21 and the semiconductor package section 23 are shifted from each other in the longitudinal direction so that a part of the semiconductor package section 23 is overlapped on a part of the substrate section 21 in a direction perpendicular to the surface of the planar shape as shown in FIG. 3B.

In addition, as shown in FIG. 3C, a plurality of aforementioned card side terminals 7 are created on the surface of the planar shape of the semiconductor package section 23.

The substrate section 21 and the semiconductor package section 23 are joined to each other by a junction section 31.

As shown in FIG. 3B, the card side terminals 7 are provided on the outer side of the surface of the semiconductor package section 23 so that the substrate section 21 can be overlapped on the inner side of the semiconductor package section 23.

As described above, the substrate section 21 employs a proximity radio communication electronic component 27.

To put it more concretely, the proximity radio communication electronic component 27 is provided on a surface on a side on which the substrate section 21 is joined to the semiconductor package section 23.

In addition, a portion of the proximity radio communication electronic component 27 is veiled by the cover 29 to be protected.

However, a part of electronic components having a height greater than the height of the cover 29 provides a hole having a loophole structure in the cover 29.

It is to be noted that the proximity radio communication electronic component 27 is assumed to be a component for carrying out proximity radio communications in order to perform a function to authenticate the owner of the memory card 1, a card key function, and the like.

Nevertheless, functions of the proximity radio communication electronic component 27 are by no means limited to these.

As shown in FIG. 3B, it is desirable to provide a configuration in which the heights of the proximity radio communication electronic component 27 and the cover 29 are equal to or slightly smaller than the height of the semiconductor package section 23.

Such a configuration has a merit that the first cabinet 17 does not have to be specially provided with a dent or the like.

If the first cabinet 17 is provided with a dent or the like, the heights of the proximity radio communication electronic component 27 and the cover 29 can be made greater than the height of the semiconductor package section 23.

In many cases, a plurality of semiconductor chips are piled up in the semiconductor package section 23. In addition, the semiconductor chips are sealed in the semiconductor package section 23 by making use of a resin material and the like. Thus, the height of the piled-up semiconductor chips increases in many cases.

Thus, if a structure like the one shown in FIG. 3B is adopted, it is possible to assure a sufficient space used for providing the proximity radio communication electronic component 27.

The above description is summarized as follows. First of all, the substrate section 21 and the semiconductor package section 23 are shifted from each other in the longitudinal direction so that a portion of the semiconductor package section 23 is overlapped on a portion of the substrate section 21 in a direction perpendicular to the surface of the planar shape as shown in FIG. 3B.

Then, the proximity radio communication electronic component 27 is provided on a surface on a side on which the substrate section 21 is joined to the semiconductor package section 23.

In addition, in many cases, the semiconductor package section 23 has a large height.

Taking the facts explained in the above description into consideration, the structure according to this embodiment can be adopted to assure a sufficient space to be used for providing the proximity radio communication electronic component 27.

In addition, the card side terminals 7 are provided on the semiconductor package section 23 instead of the substrate section 21. Thus, it is possible to avoid generation of a state in which the card side terminals 7 and the semiconductor package section 23 having the card side terminals 7 are bent.

The following description explains why it is possible to avoid generation of such a state.

First of all, the semiconductor package section 23 is configured to have a relatively large thickness. In addition, the semiconductor package section 23 is also configured to make use of a resin material which has a relatively high strength in comparison with that of the substrate section 21.

Since the card side terminals 7 are provided on the semiconductor package section 23, it becomes more difficult to generate a state such as a shifted position of a card side terminal 7 due to a bent or a bad contact between a card side terminals 7 and slot side terminals 13.

It is to be noted that, in order to further enhance the strength of the semiconductor package section 23 if necessary, a strengthened plastic material having a higher strength or an FRP (Fiber Reinforced Plastics) can be used. Also, in some cases, a metallic plate can be embedded in the semiconductor package section 23 or laid on the surface of the semiconductor package section 23.

[Description of Connecting of the Semiconductor Package Section 23 to the Substrate Section 21]

Figure 4:
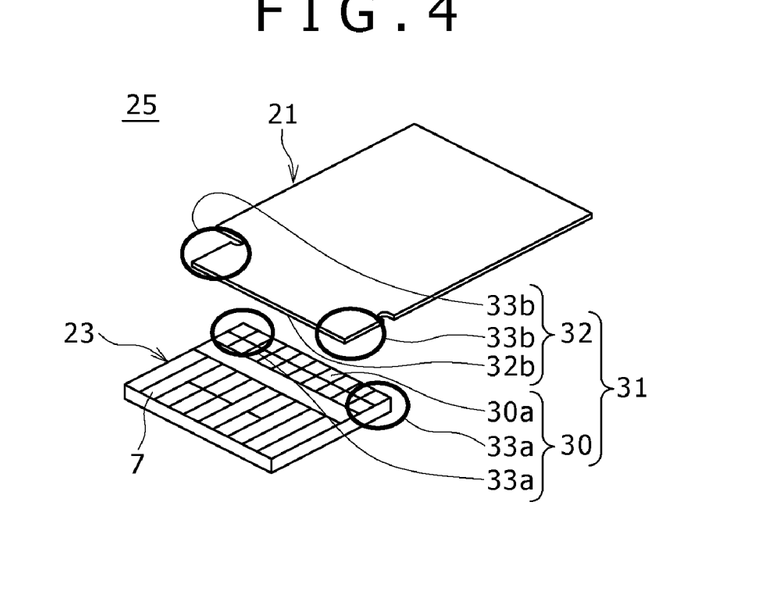
FIG. 4 is a perspective view of a description of a method for joining a semiconductor package section to a substrate section in the memory card.

FIG. 4 is a perspective view showing a method for connecting the semiconductor package section 23 to the substrate section 21.

As shown in FIG. 4, the substrate section 21 is connected to the semiconductor package section 23 by the junction section 31 in a state of partially overlapping each other.

A plurality of package side terminals 30 are provided on the semiconductor package section 23 to serve as a terminal for exchanging an information signal with the substrate section 21.

Figure 7:
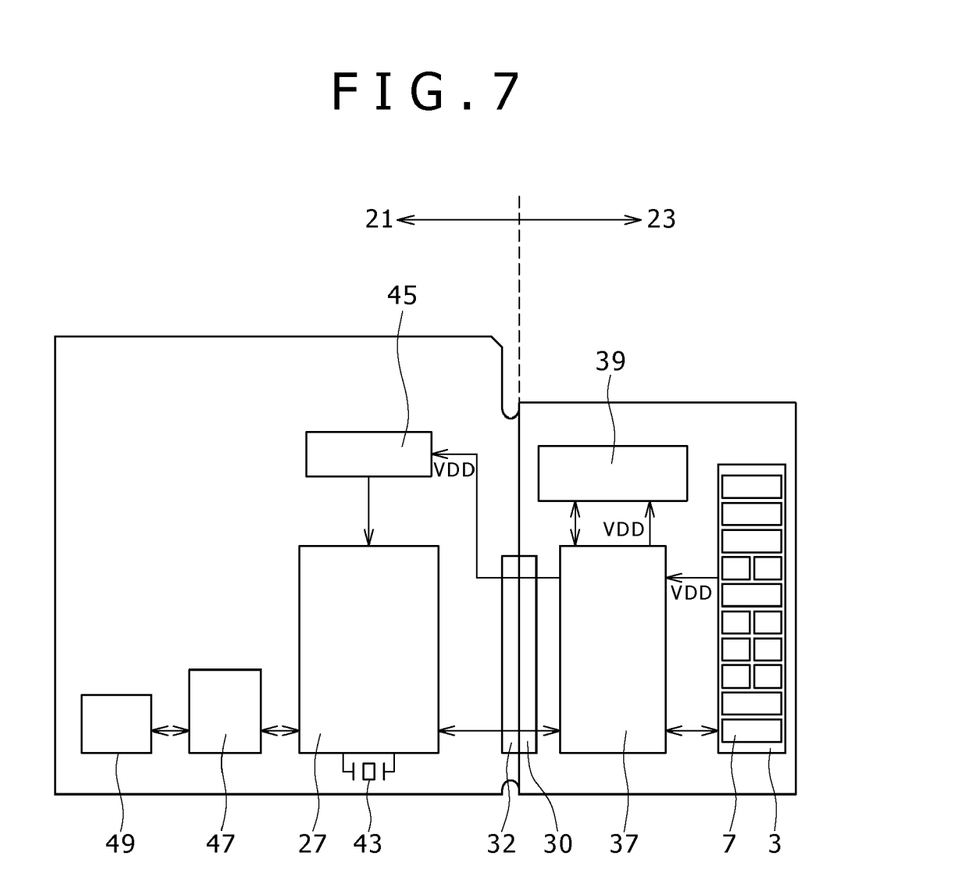
FIG. 7 is a block diagram explaining a signal processing system included in the memory card.

As shown in FIG. 7, each of the package side terminals 30 is electrically connected to the controller section 37.

A plurality of substrate side terminals 32 are provided on the substrate section 21 at a location corresponding to the location of a package side terminal 30.

As shown in FIG. 7, each of the package side terminals 32 is electrically connected to the proximity radio communication electronic component 27 provided on the substrate section 21.

That is to say, the controller section 37 provided on the semiconductor package section 23 is electrically connected to the proximity radio communication electronic component 27 provided on the substrate section 21 through the package side terminals 30 and the substrate side terminals 32.

Also, in order to strengthen the connection between the semiconductor package section 23 and the substrate section 21, reinforcement lands 33 are provided in addition to package-side lands 30a and substrate-side lands 32b each having a normal size.

The reinforcement lands 33 are lands 33a included in the package side terminals 30 and lands 33b included in the substrate side terminals 32. To put it in detail, the lands 33a are terminals provided at both ends of an array including the package side terminals 30 whereas the lands 33b are terminals provided at both ends of an array including the substrate side terminals 32.

Each of the reinforcement lands 33 is a terminal having an area larger than those of other terminals in the package side terminals 30 and the substrate side terminals 32. The other terminals in the package side terminals 30 and the substrate side terminals 32 are package side lands 30a and substrate-side lands 32b.

It is to be noted that a reinforcement land 33 provided on the side of the semiconductor package section 23 is referred to as a package-side reinforcement land 33a whereas a reinforcement land 33 provided on the side of the substrate section 21 is referred to as a substrate-side reinforcement land 33b.

By providing each of the reinforcement lands 33 to serve as a terminal having an area larger than those of other terminals in the package side terminals 30 and the substrate side terminals 32 as described above, it is possible to strengthen the connection between the semiconductor package section 23 and the substrate section 21.

The substrate section 21 can be connected to the semiconductor package section 23 through the reinforcement lands 33 by adoption of a soldering technique.

However, the joining of the substrate section 21 to the semiconductor package section 23 is by no means limited to the soldering technique making use of the reinforcement lands 33. For example, the substrate section 21 can also be connected to the semiconductor package section 23 by making use of a reinforcement resin material in addition to the soldering technique.

Furthermore, the substrate section 21 can also be connected to the semiconductor package section 23 by adoption of a thermal compression bonding/joining method which makes use of an ACF (anisotropic conductive film), an NCF (non-conductive film), an ACP (anisotropic conductive paste), an NCP (non-conductive paste) or the like.

In addition, the substrate section 21 can also be connected to the semiconductor package section 23 by adoption of a connecting method which makes use of a conductive paste such as an Ag paste.

Also, instead of connecting the substrate section 21 to the semiconductor package section 23 through terminals each used for propagating an information signal, the connection between the substrate section 21 and the semiconductor package section 23 can be strengthened by adoption of another method.

For example, the substrate section 21 can be connected to the semiconductor package section 23 by making use of bolts, nuts and screws, a bonding material, and a setting-up technique.

[Cross Sectional Shape]

Figure 5:
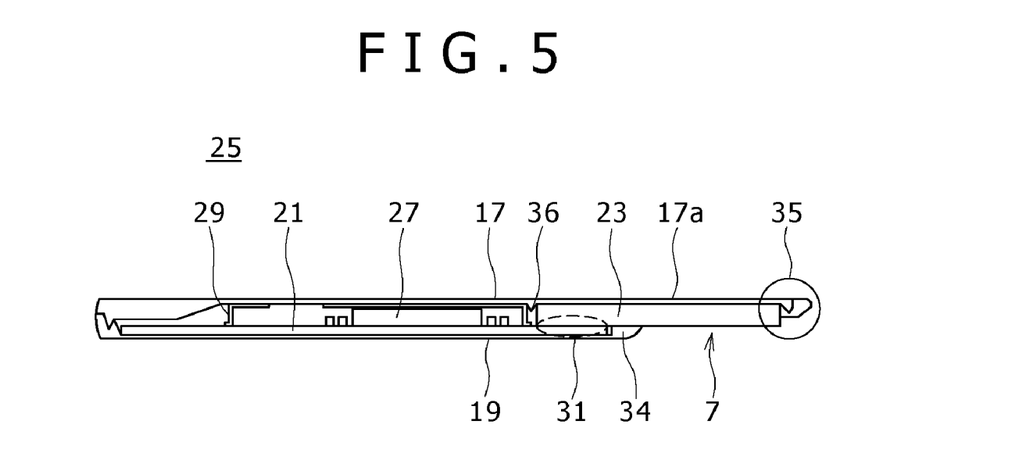
FIG. 5 is a diagram showing a cross section along a line V-V shown in the perspective view which serves as FIG. 1.

FIG. 5 is an explanatory diagram showing a cross section along a line V-V shown in FIG. 1.

In addition, FIG. 5 is also an explanatory diagram showing a connection between the semiconductor package section 23 and the first cabinet 17.

The card side terminals 7 are created on the semiconductor package section 23.

When the memory card 1 is inserted into the slot 9, the card side terminals 7 are engaged with the slot side terminals 13.

The card side terminals 7 are engaged with the slot side terminals 13 as the card side terminals 7 are pressed against the slot side terminals 13.

As a result, the card side terminals 7 are undesirably deformed in a direction toward the first cabinet 17. (In FIG. 5, the direction toward the first cabinet 17 is the upward direction.)

With the card side terminals 7 put in a state of being deformed in the direction toward the first cabinet 17, an external force is applied to the junction section 31 between the semiconductor package section 23 and the substrate section 21.

Then, it is possible to cause the connection to the junction section 31 to be weakened by the external force.

Thus, in order for the semiconductor package section 23 to receive the external force applied by the slot side terminals 13, at a welding section 35, the semiconductor package section 23 is welded to the first cabinet 17 through the welding section 35 which is provided at a position on a side opposite to the junction section 31 with respect to the semiconductor package section 23.

By virtue of the welding section 35, it is possible to prevent the semiconductor package section 23 from being bent.

In addition, the welding section 35 also exhibits an effect to prevent the semiconductor package section 23 from making a movement relative to the first cabinet 17.

It is to be noted that the movement of the semiconductor package section 23 in the direction to the first cabinet 17 is avoided not only because of the welding section 35, but also because of contact of the semiconductor package section 23 with the inner surface of the first cabinet 17.

A pressing section 17a of the first cabinet 17 is brought into contact with one of planar surfaces of the semiconductor package section 23. This planar surface with which the pressing section 17a of the first cabinet 17 is brought into contact is a planar surface not joined to the substrate section 21.

By bringing the pressing section 17a into contact with this planar surface, it is possible to carry out a function to prevent the semiconductor package section 23 from moving.

That is to say, the pressing section 17a has a function to support the semiconductor package section 23.

A position setting section 36 is created on the first cabinet 17.

The position setting section 36 is created at about the same position as one end of the semiconductor package section 23.

The position setting section 36 has a function to determine the position of the semiconductor package section 23 and to firmly hold the semiconductor package section 23 at the determined position.

In addition, the position setting section 36 also has a function to determine the position of the cover 29 and to firmly hold the cover 29 at the determined position.

A support section 34 is created at the end of the longitudinal direction of the second cabinet 19.

The support section 34 has a function to determine the position of the substrate section 21 in the longitudinal direction and to firmly hold the substrate section 21 at the determined position.

In addition, the support section 34 also plays the role of supporting the semiconductor package section 23.

That is to say, the support section 34 also has a function to prevent the semiconductor package section 23 from being bent in a right downward direction in FIG. 5. In this way, the support section 34 plays the role of supporting the junction built by the junction section 31.

It is to be noted that a positional relationship between the cover 29 and the proximity radio communication electronic component 27 are shown in FIG. 5.

The cover 29 is provided to protect the proximity radio communication electronic component 27.

That is to say, the cover 29 is provided in order to prevent the proximity radio communication electronic component 27 from being damaged when the first cabinet 17 is bent in the inward direction due to an external force applied to the first cabinet 17.

In addition, the cover 29 can be further provided with an electro-magnetic shield function.

That is to say, the cover 29 is made from a conductive material so that the cover 29 has no unnecessary electro-magnetic wave effect on the proximity radio communication electronic component 27 beneath the cover 29.

In addition, with the cover 29 made from a conductive material, the cover 29 is capable of protecting (or shielding) the proximity radio communication electronic component 27 from a static electrical effect.

3: Electrical Configuration of the Memory Card 1

[Positional Relationship between Electrical Components]

Figure 6A:
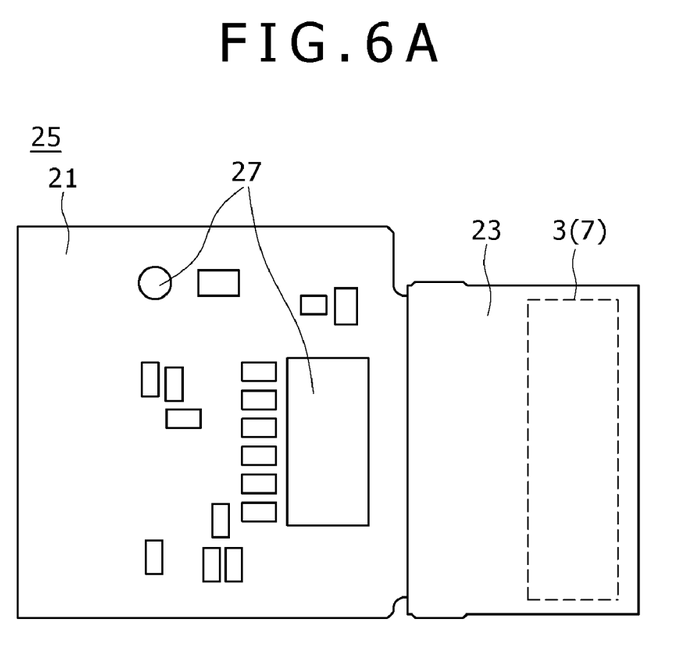
FIG. 6A is a diagram showing the electronic circuit section shown in the explanatory diagram serving as FIG. 3A with the cover of the electronic circuit section removed.
Figure 6B:
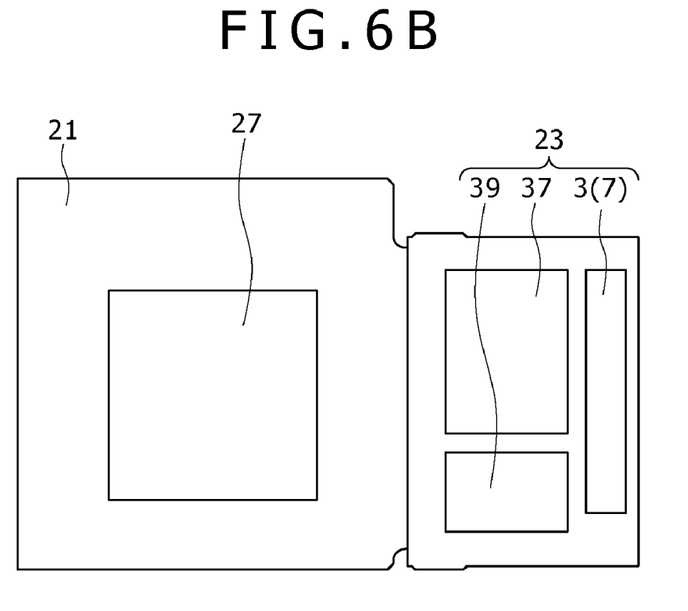
FIG. 6B is a diagram of functions of the electronic circuit section shown in FIG. 6A.

FIGS. 6A and 6B are a plurality of explanatory diagrams each showing the structure the electronic circuit section 25.

FIG. 6A shows the electronic circuit section 25 shown in FIG. 3A with the cover of the electronic circuit section 25 removed.

As shown in FIG. 6A, at the position of the cover 29 for veiling the substrate section 21, the proximity radio communication electronic component 27 is provided.

In addition, on a side opposite to the semiconductor package section 23, the card side connector section 3 is created.

On the card side connector section 3, a plurality of card side terminals 7 are created.

As described above, FIG. 6B is an explanatory diagram to be referred to in description of functions of the electronic circuit section 25 shown in FIG. 6A.

As shown in FIG. 6B, on the substrate section 21, the proximity radio communication electronic component 27 is provided.

In addition, on the semiconductor chip of the semiconductor package section 23, the card side connector section 3, a controller section 37 and a memory section 39 are created.

FIG. 7 is a block diagram explaining a signal processing system included in the memory card 1.

[Description of Semiconductor Package 23]

On the semiconductor chip of the semiconductor package section 23, the memory section 39, the controller section 37, the card side connector section 3, and package side terminals 30 are created. The card side connector section 3 includes card side terminals 7.

Figure 8:
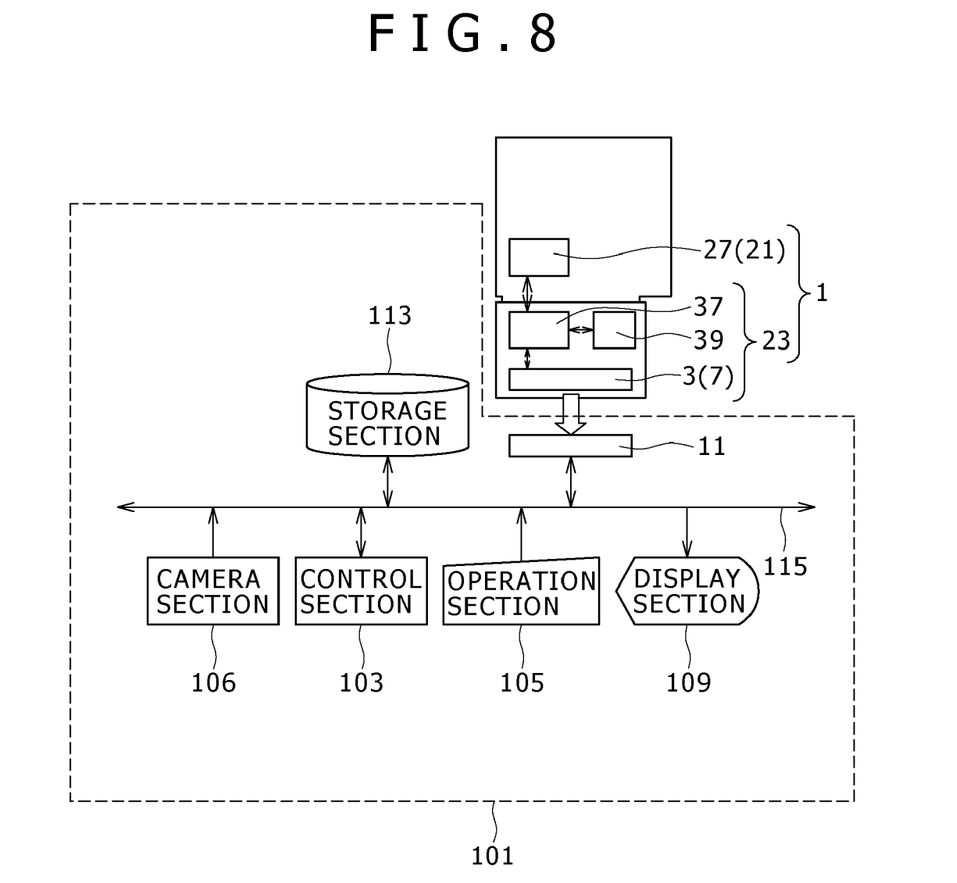
FIG. 8 is a block diagram showing a signal processing system included in a digital still camera connected to the memory card.

As shown in FIG. 8, the card side connector section 3 connects the memory card 1 to an electronic apparatus which serves as a digital still camera 101.

To put it in detail, the card side connector section 3 connects the memory card 1 to an electronic circuit employed in the digital still camera 101. That is to say, the card side connector section 3 serves as a window through which information is exchanged between the memory card 1 and the electronic circuit employed in the digital still camera 101.

In addition, power generated by the digital still camera 101 is supplied to the controller section 37 by way of the card side connector section 3.

The card side connector section 3 is capable of inputting and outputting an information signal exchanged between the controller section 37 and the digital still camera 101. Typical examples of the information signal are an instruction information signal and a data signal.

That is to say, the digital still camera 101 is capable of issuing an instruction to the controller section 37 by way of the card side connector section 3.

Then, in accordance with the instruction received from the digital still camera 101, the controller section 37 issues a command determined in advance to the memory section 39 and the proximity radio communication electronic component 27.

Then, in accordance with the predetermined command received from the controller section 37, the memory section 39 stores an information signal supplied by the controller section 37.

As an alternative, in accordance with the predetermined command received from the controller section 37, the memory section 39 outputs an information signal stored in the memory section 39 to the controller section 37.

In addition, various kinds of information used for processing carried out by the proximity radio communication electronic component 27 have been stored in the memory section 39. A typical example of the information is ID (identification) information.

However, it is not always necessary to store the various kinds of information used for processing carried out by the proximity radio communication electronic component 27 in the memory section 39.

That is to say, the various kinds of information used for processing carried out by the proximity radio communication electronic component 27 can be stored in the memory section 39 by the proximity radio communication electronic component 27 itself, if necessary.

Another typical example of the information used for processing carried out by the proximity radio communication electronic component 27 is authentication information.

[Description of Substrate Section 21]

The substrate section 21 is configured to include the proximity radio communication electronic component 27, an oscillation circuit 43, a power block 45, an RF block 47 and a coupler 49.

The proximity radio communication electronic component 27 is electrically connected to the controller section 37 through the package side terminals 30 employed in the semiconductor package section 23 and the substrate side terminals 32 employed in the substrate section 21 which includes the proximity radio communication electronic component 27.

To put it more concretely, the proximity radio communication electronic component 27 is electrically connected to the controller section 37 through the package side terminals 30 and the substrate side terminals 32.

Thus, the proximity radio communication electronic component 27 is capable of exchanging an instruction signal and an information signal with the controller section 37.

It is to be noted that the proximity radio communication electronic component 27 is capable of receiving an information signal from the memory section 39 by way of the controller section 37. In addition, the proximity radio communication electronic component 27 is also capable of exchanging an instruction signal and an information signal with the electronic apparatus serving as the digital still camera 101 through the semiconductor package section 23.

The proximity radio communication electronic component 27 is the central component for carrying out control and processing to exhibit a proximity radio communication function.

To put it more concretely, the proximity radio communication electronic component 27 controls operations carried out by the RF block 47. In addition, the proximity radio communication electronic component 27 also carries out various kinds of processing on a radio communication signal received from the RF block 47.

Typical examples of the processing carried out by the proximity radio communication electronic component 27 on a radio communication signal received from the RF block 47 are decoding and transformation of information.

The proximity radio communication electronic component 27 is connected to the oscillation circuit 43 which supplies a signal having a fixed frequency to the proximity radio communication electronic component 27.

Typically, the oscillation circuit 43 is oscillating at the fixed frequency of 20 MHz.

The power block 45 receives a VDD signal from the controller section 37 and generates currents for a variety of voltages such as 3.3 V, 1.8 V and 1.2 V which the proximity radio communication electronic component 27 needs.

Such currents generated are supplied to the proximity radio communication electronic component 27.

The RF block 47 is configured to include a variety of electronic components controlled by the proximity radio communication electronic component 27 to serve as components for carrying out radio communications.

Typical electronic components include a power amplifier and a modulation section.

The coupler 49 has functions of an antenna.

The coupler 49 is configured to be capable of carrying out wave communications for short distances not exceeding a length determined in advance.

However, the coupler 49 can also be configured to function as an ordinary antenna.

[Relationship with the Digital Still Camera 101]

FIG. 8 is a block diagram showing a signal processing system included in the digital still camera 101 connected to the memory card 1.

As shown in FIG. 8, the digital still camera 101 is configured to employ a variety of electronic apparatus connected to each other by a system bus 115. The system bus 115 includes a plurality of lines such as address lines, data lines, and control lines.

To put it more concretely, the electronic apparatus include a control section 103, an operation section 105, a display section 109, a camera section 106 and a storage section 113. The control section 103 is the central section for carrying out control of the other electronic apparatus and signal processing.

In addition, the system bus 115 is connected to the slot-side connector section 11.

The digital still camera 101 exchanges information signals and instruction signals with the memory card 1 through the slot-side connector section 11.

The camera section 106 takes a moving or static image of an external video.

Subsequently, the taken moving or static image is supplied to the control section 103 as an image information signal.

Then, the control section 103 carries out various kinds of processing on the image information signal. If necessary, the control section 103 displays the result of the processing on the display section 109.

It is to be noted that the camera section 106 is capable of carrying out operations such as an operation to change the shutter speed and an optical zoom operation.

The operation section 105 employs a plurality of operation buttons and the like to be operated by the user to enter commands to the digital still camera 101.

When the user carries out an operation on these keys, the operation section 105 generates a signal representing the operation and outputs the signal to the control section 103 to serve as a command issued by the user.

The display section 109 is typically an LCD (Liquid Crystal Display) unit or an OLED (Organic Light Emitting Diode) display unit. The display section 109 displays an image based on a video signal received from the control section 103.

While the user is verifying an image appearing on the display section 109, the user operates the operation section 105 in order to adjust attributes of the camera section 106. The attributes include brightness, an angle, a zoom and the shutter speed.

The storage section 113 is used for storing various kinds of data used in various kinds of processing carried out by the digital still camera 101.

For example, the storage section 113 is used for storing a variety of processing programs and various kinds of data to be used by the digital still camera 101.

It is to be noted that, in general, the storage section 113 is used for storing basic data to be used by the digital still camera 101 whereas the memory section 39 employed in the memory card 1 is used for storing image information taken by the camera section 106.

However, the storage section 113 can also be used for storing image information taken by the camera section 106.

The control section 103 is a section for controlling the entire operation of the digital still camera 101.

To put it in detail, the control section 103 controls various kinds of processing carried out by the digital still camera 101.

In this embodiment, in particular, the control section 103 controls instructions issued by the digital still camera 101 to the memory card 1.

To put it more concretely, the control section 103 controls an operation to write information into the memory section 39 employed in the memory card 1 and an operation to read out information from the memory section 39.

In addition, the control section 103 also controls the proximity radio communication electronic component 27.

Further, the control section 103 executes a variety of programs in order to make use of the proximity radio communication electronic component 27 more effectively.

Furthermore, in some cases, the control section 103 displays various kinds of information on the display section 109 and stores various kinds of information in the storage section 113.

In accordance with the embodiment described above, the memory card 1 includes a semiconductor package section 23 having memory functions and a substrate section 21 connected to the semiconductor package section 23 by superposition. The substrate section 21 has the proximity radio communication electronic component 27.

In addition, the semiconductor package section 23 has a card side connector section 3 including card side terminals 7 for inputting and outputting information signals. The card side connector section 3 is created on a surface on which a junction between the substrate section 21 and the semiconductor package section 23 is formed.

Further, the semiconductor package section 23 also includes package side terminals 30 at a location at which the semiconductor package section 23 is joined to the substrate section 21 by superposition.

Also, the substrate section 21 includes substrate side terminals 32 at a location at which the substrate section 21 is joined to the semiconductor package section 23 by superposition.

In addition, the substrate section 21 is electrically connected to the semiconductor package section 23 by making use of the package side terminals 30 and the substrate side terminals 32.

Then, the superposition junction between the semiconductor package section 23 and the substrate section 21 is provided with such an offset that the card side connector section 3 is exposed.

With the configuration described above, it is possible to avoid generation of a state in which the card side terminals 7 and the semiconductor package section 23 having the card side terminals 7 are bent.

In addition, with the configuration described above, it is possible to assure a sufficient space to be used for providing the proximity radio communication electronic component 27.

The semiconductor package section 23 also includes a memory section 39 and a controller section 37 which is used for controlling the proximity radio communication electronic component 27 and the memory section 39.

In addition, the card side terminals 7 include input/output terminals used by the controller section 37 for inputting and outputting information signals.

With the configuration described above, it is possible to implement a proximity radio communication electronic component requiring a number of electronic elements in a card device demanded to have a small size such as the memory card 1.

The semiconductor package section 23 and the substrate section 21 are accommodated in a space sandwiched between the first cabinet 17 and the second cabinet 19. The first cabinet 17, the second cabinet 19, and the semiconductor package section 23 and the substrate section 21 are welded at an offset-direction terminal section.

With the configuration described above, it is possible to avoid generation of a state in which the card side terminals 7 and the semiconductor package section 23 having the card side terminals 7 is bent.

The package side terminals 30 have the package-side reinforcement lands 33a each having an area larger than other terminals whereas the package side terminals 30 have the substrate-side reinforcement lands 33b each having an area larger than other terminals.

In addition, the junction between the semiconductor package section 23 and the substrate section 21 is formed by including the package-side reinforcement lands 33a and the substrate-side reinforcement lands 33b.

With the configuration described above, it is possible to strengthen the junction between the semiconductor package section 23 and the substrate section 21.

The cabinet of the memory card 1 is configured to have the first cabinet 17 and the second cabinet 19.

Also, the position setting section 36 protruding in the inward direction is created on the first cabinet 17. The position setting section 36 is used for firmly holding the semiconductor package section 23 accommodated in the cabinet of the memory card 1.

With the configuration described above, the position setting section 36 can be used to determine the position of the semiconductor package section 23 and to firmly hold the semiconductor package section 23 at the determined position.

Also, the position setting section 36 has a function to determine the position of the cover 29 and to firmly hold the cover 29 at the determined position.

The support section 34 is created at the longitudinal-direction position of the second cabinet 19 by bringing the support section 34 into contact with the semiconductor package section 23.

With the configuration described above, the support section 34 is capable of carrying out a function to determine the position of the substrate section 21 in the longitudinal direction and to firmly hold the substrate section 21 at the determined position.

Also, the support section 34 plays the role of supporting the semiconductor package section 23.

That is to say, the support section 34 has a function to prevent the semiconductor package section 23 from being bent in a right downward direction in FIG. 5. In this way, the support section 34 plays the role of supporting the junction built by the junction section 31.

A variety of electronic components include at least the proximity radio communication electronic component 27 which has radio functions.

With the configuration described above, the proximity radio communication electronic component 27 requiring a number of electronic elements can be implemented in the memory card 1.

The radio functions are a proximity radio communication technology.

With the configuration described above, radio communications can be carried out by limiting the communication range to a narrow one.

The center frequency of the proximity radio communication technology is 4.48 GHz.

With the configuration described above, fast communications can be carried out.

The card device according to the present invention does not have to have a function to store information only but can have functions other than the function to store information.

For example, the card device according to the present invention can have functions such as a function to authenticate the owner of the card device serving as a non-contact IC card, a financial settlement function, a card key function, a location detection function, a communication/phone-call function, a password storing function and functions of a main CPU or a sub-CPU.

In addition, the card device can also have a function of a display section employed in an implemented display apparatus such as a liquid-crystal display apparatus or an OLCD (Organic Liquid Crystal Display) apparatus.

That is to say, if necessary, the card device can be provided with a variety of functions other than the function to store information.

The variety of electronic components used for carrying out the proximity radio communication function are typical examples of a variety of electronic components provided by the present invention.

For example, the variety of electronic components provided by the present invention are electronic components used for carrying out functions such as the function to authenticate the owner of the card device serving as a non-contact IC card, the financial settlement function, the card key function, the location detection function, the communication/phone-call function, the password storing function and functions of a main CPU or a sub-CPU.

Further, the variety of electronic components provided by the present invention can be components for display such as a liquid-crystal display apparatus or an OLCD apparatus.

That is to say, the variety of electronic components provided by the present invention can be electronic components used for carrying out necessary functions.

Each of the first cabinet 17 and the second cabinet 19 is a typical cabinet according to the present invention.

The cabinet according to the present invention can be any case as long as the case can be used to accommodate the substrate section 21 and the semiconductor package section 23.

The memory section 39 can be used for storing an authentication information signal for authenticating the owner of the card device serving as a non-contact IC card.

With the configuration described above, it is possible to carry out the function to authenticate the owner of the card device serving as a non-contact IC card more effectively.

Implementations of the present invention are by no means limited to the embodiment described above. A variety of other embodiments can be used to implement the present invention.

The present application contains subject matter related to that disclosed in Japanese Priority Patent Application JP 2009-298720 filed in the Japan Patent Office on Dec. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A card device comprising:
a semiconductor package section having memory functions; and
a substrate section superposed on and joined to said semiconductor package section at a superposition junction and having a variety of electronic components mounted thereon,
wherein,
   (a) said semiconductor package section includes
      (1) a card-side connector section having card-side terminals for inputting and outputting information signals created on a surface on which a junction between said substrate section and said semiconductor package section is formed,
      (2) package-side terminals at a location at which said semiconductor package section is joined to said substrate section, and
   (b) said substrate section includes substrate-side terminals at a location at which said substrate section is connected to said semiconductor package section, said substrate section being electrically joined to said semiconductor package section by making use of said package-side terminals and said substrate-side terminals, and said superposition junction between said semiconductor package section and said substrate section being provided with such an offset that said card-side connector protrudes out off said card device.

2. The card device according to claim 1, wherein:
said semiconductor package section includes a memory section and a controller section controlling said electronic components and said memory section, and
said card-side terminals include input/output terminals used by said controller section for inputting and outputting information signals.

3. The card device according to claim 1, wherein:
said semiconductor package section and said substrate section are accommodated in a cabinet, and
said cabinet and said semiconductor package section are welded to each other at an offset direction end.

4. The card device according to claim 1, wherein:
said package-side terminals include package-side reinforcement lands each having an area larger than those of the other terminals,
said substrate-side terminals include substrate-side reinforcement lands each having an area larger than those of the other terminals, and
said junction between said semiconductor package section and said substrate section is implemented by including said package-side reinforcement lands and said substrate-side reinforcement lands.

5. The card device according to claim 3, wherein:
said cabinet is configured to comprise a first cabinet and a second cabinet, and
a position setting section protruding in an inward direction is created on said first cabinet to accommodate said semiconductor package section.

6. The card device according to claim 4, wherein
a support section is created at a longitudinal-direction position of said second cabinet by bringing said support section into contact with said semiconductor package section.

7. The card device according to claim 1, wherein
at least one of said electronic components is an electronic components having a radio communication function.

8. The card device according to claim 7, wherein
said radio communication function is based on a proximity radio communication technology.

9. The card device according to claim 8, wherein
said proximity radio communication technology has a center frequency of 4.48 GHz.

10. The card device according to claim 7, wherein
said memory section is used for storing an authentication information signal for a non-contact IC (Integrated Circuit) card.

11. A card device comprising:
semiconductor package means for having memory functions; and
substrate means superposed on and joined to said semiconductor package means at a superposition junction and having a variety of electronic components mounted thereon,
wherein,
   (a) said semiconductor package means includes
      (1) card-side connector means for having card-side terminals for inputting and outputting information signals created on a surface on which a junction between said substrate means and said semiconductor package means is formed,
      (2) package-side terminals at a location at which said semiconductor package means is joined to said substrate means, and
   (b) said substrate means includes substrate-side terminals at a location at which said substrate means is connected to said semiconductor package means, said substrate means being electrically joined to said semiconductor package means by making use of said package-side terminals and said substrate-side terminals, and said superposition junction between said semiconductor package means and said substrate means being provided with such an offset that said card-side connector protrudes out off said card device.

* * * * *